(12) United States Patent
Ikeda et al.

(10) Patent No.: US 7,227,985 B2
(45) Date of Patent: Jun. 5, 2007

(54) DATA CLASSIFIER FOR CLASSIFYING PATTERN DATA INTO CLUSTERS

(75) Inventors: Hitoshi Ikeda, Ashigarakami-gun (JP); Noriji Kato, Ashigarakami-gun (JP); Hirotsugu Kashimura, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 702 days.

(21) Appl. No.: 10/375,136

(22) Filed: Feb. 28, 2003

(65) Prior Publication Data

US 2003/0169919 A1 Sep. 11, 2003

(30) Foreign Application Priority Data

Mar. 5, 2002 (JP) .............................. 2002-059012

(51) Int. Cl.
*G06K 9/62* (2006.01)

(52) U.S. Cl. ...................................... 382/159; 382/225

(58) Field of Classification Search ................ 382/159, 382/181, 209, 218, 224, 225, 228
See application file for complete search history.

(56) References Cited

U.S. PATENT DOCUMENTS

| | | | |
|---|---|---|---|
| 5,479,570 A * | 12/1995 | Imagawa et al. | 706/20 |
| 5,703,964 A * | 12/1997 | Menon et al. | 382/228 |
| 6,094,653 A * | 7/2000 | Li et al. | 707/6 |
| 6,108,446 A * | 8/2000 | Hoshen | 382/225 |
| 6,650,779 B2 | 11/2003 | Vachtesvanos et al. | |
| 6,778,705 B2 * | 8/2004 | Gutta et al. | 382/224 |
| 6,904,423 B1 | 6/2005 | Nicolaou et al. | |
| 2003/0158828 A1 | 8/2003 | Ikeda et al. | |

FOREIGN PATENT DOCUMENTS

| | | |
|---|---|---|
| JP | A 7-234854 | 9/1995 |
| JP | A 8-36557 | 2/1996 |
| JP | A 2002-190025 | 7/2002 |
| JP | A 2002-329188 | 11/2002 |

OTHER PUBLICATIONS

Kohonen, "Self-Organized Formation of Topologically Correct Feature Maps", Biological Cybernetics, vol. 43, pp. 59-69, 1982.
Ultsch et al., "Knowledge Extraction from Artificial Neural Networks and Applications", Proc. Transputer Anwender Treffen/World Transputer Congress TAT/WTC 93 Aachen, Springer, 1993.
Coomans et al., "Potential Methods in Pattern Recognition Part 2. CLUPOT—an Unsupervised Pattern Recognition Technique", Analytica Chimica Acta, vol. 133, pp. 225-239, 1981.

(Continued)

*Primary Examiner*—Daniel Miriam
(74) *Attorney, Agent, or Firm*—Oliff & Berridge, PLC

(57) ABSTRACT

A data classifier classifies a plurality of input pattern data into one or more clusters. For each pattern data, a cluster to which the pattern data belongs is provisionally determined. For each cluster, a predetermined correlation value is calculated between one or more pattern data belonging to the cluster and observational pattern data which is a target to be classified into a cluster. A cluster to which the observational pattern data belongs is determined based on the correlation values.

13 Claims, 11 Drawing Sheets

OTHER PUBLICATIONS

Terashima et al., "Unsupervised Cluster Segmentation Method Using Data Density Histogram on Self-Organizing Feature Map", Papers of the Institute of Electronics, Information, and Communication Engineers, D-II, vol. J79-D-II, No. 7, pp. 1280-1290, 1996.

Kirk et al., "A Self-Organizing Map with Dynamic Architecture for Efficient Quantization", IEEE, pp. 2128-2132, 2001.

Bauer et al., "Quantifying the Neighborhood Preservation of Self-Organizing Feature Maps", IEEE Transactions on Neural Networks, vol. 3, No. 4, pp. 570-579, 1992.

Martinetz et al., "Three-Dimensional Neural Net for Learning Visuomotor Coodination of a Robot Arm", IEEE Transactions on Neural Networks, vol. 1, No. 1, pp. 131-136, 1990.

Kohonen, "The Self-Organizing Map", Proceedings of the IEEE, vol. 78, No. 9, pp. 1464-1480, 1990.

Haese et al., "Auto-SOM: Recursive Parameter Estimation for Guidance of Self-Organizing Feature Maps", Neural Computation, vol. 13, pp. 595-619, 2001.

* cited by examiner

A - STATE

| 7 | 8 | 9 |
|---|---|---|
| 4 | 5 | 6 |
| 1 | 2 | 3 |

B - STATE

| 7 | 8 | 9 |
|---|---|---|
| 4 | 5 | 6 |
| 4 | 2 | 3 |

C - STATE

| 4 | 6 | 6 |
|---|---|---|
| 4 | 4 | 6 |
| 4 | 4 | 6 |

D - STATE

| (4) | New | (6) | (6) |
|-----|-----|-----|-----|
| (4) | (4) | New | (6) |
| (4) | (4) | New | (6) |

New : NEW PROTOTYPE

FIG. 6

|   |   |   |
|---|---|---|
| 1 | 1 | 2 |
| 1 | 1 | 2 |
| 1 | 2 | 2 |

FIG. 7

A - STATE

| | | New | |
|---|---|---|---|
| | | New | |
| | New | | |

B - STATE

| 1 | 1 | 2 | 2 |
|---|---|---|---|
| 1 | 1 | 2 | 2 |
| 1 | 2 | 2 | 2 |

FIG. 8

DATA CLASSIFIER FOR CLASSIFYING PATTERN DATA INTO CLUSTERS

BACKGROUND OF THE INVENTION

1. Field of the Invention

The present invention relates to a data classifier for classifying various data, such as sensory data including image and voice information.

2. Description of the Related Art

In recent years, the amount of information people receive has rapidly increased with the spread and advancement of information devices. In this environment, in order to facilitate selection of desired information, there is a strong demand for techniques for recognizing and classifying information without any human intervention.

To address this demand, there is a known clustering method wherein data to be classified are compared and similar data are classified into groups of data. For the determination of similarity, various methods are known such as, for example, a maximum likelihood method, a K-means method, a merge method, and an MDS (Multi-Dimensional Scaling) method. These clustering methods all require human execution of processes such as parameter setting.

On the other hand, as a method for performing the clustering process relatively autonomously, a method is known wherein input image data which is one of pattern data is classified and sorted on a lattice space map. For this classification and sorting, for example, a self-organizing feature mapping (hereinafter abbreviated simply as "SOM") is used (T. Kohonen, Self-organizing formation of topologically correct feature maps, Biological Cybernetics, 1982). The SOM is a network having two layers consisting of an input layer in which data is input and a competitive layer of a lattice space map. The input is weighted and input to each lattice. A group of weights for the input components is called a weight vector.

At first, the weight vector is initialized through the following process. As described in the Kohonen reference described above, a number of input vectors are selected at random from among a plurality of input vectors (corresponding to a feature set at this point) which is a target for learning, the number being identical to a number of prototypes, and the weight vectors for the lattices are initialized. Also according to Kohonen, it is also possible to randomly set initial values for the weight vectors.

Next, a learning process is performed for the weight vectors. During the learning steps, a feature set for learning is generated and a predetermined measured value (for example, Euclid distance) is calculated from the learning feature set and the weight vectors of lattices in the lattice space. From among the lattices, a lattice having the maximum correlation (minimum measure) is found (this lattice is called a "winning node"). For lattices located in the neighborhood of this lattice (winning node) in the lattice space, the weight vector of each of these lattices is adjusted such that the measured value between the learning feature set and the lattice is reduced. After repeating the learning process while adjusting the weight vectors in such a manner, lattices having minimum values with respect to a feature set made of features that are similar to each other become concentrated in a particular area, so that a condition can be obtained which can be applied for data classification. In this process, the selection of lattices in which the weight vectors are to be adjusted is made depending on the distance on the map from the winning node. It is preferable that the amount of adjustment be variable depending on the distance from the winning node c and the magnitude of the amount of adjustment also be changeable. In general, the weight vector w is adjusted based on the following equation (1) so that the vector becomes more similar to the weight vector I of a neighborhood node:

[Equation (1)]

$$w_j(t+1)=w_j(t)+h_{cj}[I(t)-w(t)] \quad (1)$$

wherein

[Equation 2]

$$h_{cj} = \alpha(t) \cdot \exp\left[\frac{\|r_c - r_j\|^2}{2 \cdot (\sigma(t))^2}\right]$$

in which $\alpha(t)$ represents a parameter known as a learning coefficient which controls the magnitude of the amount of adjustment and $\sigma(t)$ represents a function referred to as a neighborhood function which determines the variation in the range for adjusting the weight vectors, both of which monotonically decreases with respect to time t. Adjustment according to equation (1) is performed for all lattices that belong in a range of an inter-node distance of Rmax on the map from the winning node wherein $$R\max \geq \|rc-rj\| \quad \text{[Equation 3]}$$

With repetition of learning, the value of Rmax decreases as a result of influence of the neighborhood function $\sigma(t)$. As the neighborhood function $\sigma(t)$, a function such as a triangular type function, a rectangular (quadrangular) type function, and a Mexican hat type function can be used. It is also known that the selection of the neighborhood function $\sigma(t)$ also influences the learning results. The parameter "t" represents "time step" and is incremented every time a feature set is input. The factor $\|rc-rj\|$ represents a norm (distance) between the winning node and the node in which the weight vector is to be adjusted.

Simple application of the above technique, however, does not allow immediate execution of autonomous data classification. In order to realize autonomous data classification, the appropriateness of the lattice space map must be determined after completion of the learning process. In other words, (1) a method for obtaining an optimum lattice space map is required. In addition, when data is to be classified using the lattice space map after the learning process, it is appropriate to create, in the lattice space, boundaries which form the basis for classification and to classify data given as the classification target based on where the lattice having the minimum measure with respect to the feature set corresponding to the data is located relative to the boundaries (regions in the lattice space separated by the boundaries will be referred to simply as "clusters" hereinafter). That is, (2) a method for determining the boundaries of clusters is also required.

Among these required methods, as (1) a method for obtaining an optimum lattice space map, Kohonen proposes a method for selecting a map in which the average quantization error is minimum. That is, from among a plurality of lattice space maps formed using different learning conditions, a map having the minimum average quantization error is selected and is used as an approximated optimum lattice space map. In this method, the topology of the space of the input feature set is not reflected in the topology of the map.

In other words, the degree of preservation of topology is low. This may lead to erroneous classification depending on the method for clustering.

As a method which takes into consideration the preservation of topology, a technique for forming an appropriate map by monitoring a predetermined indication called a topological function (topographic function) to control the learning conditions (Auto-SOM) has also been developed. However, the calculation of the topographic function itself is a heavily loaded process, and therefore, there is a problem in that the learning time increases.

As (2) a method for autonomously determining the boundaries of clusters, a method known as a U-matrix method (Unified Distance Matrix Method) and a method known as a potential method are both under development. The U-matrix method is described in detail in A. Ultsch et al., "Kno ledge Extraction from Artificial Neural Networks and Applications", Proc. Transputer Anwender Treffen/ World Transputer Congress TAT/WTC 93 Aachen, Springer 1993. In the U-matrix method, a sum of the absolute values of differences between the corresponding components of the weight vectors of the two lattices or the root-mean square of the differences is defined as the distance between two adjacent lattices on a map. With such a definition, the distance between adjacent lattices that are each strongly associated (that is, these lattices have weight vectors which are close to the feature set; these lattices will herein after be described as "prototyped to the feature set") with feature sets having a high similarity, that is, the distance between adjacent lattices that are prototyped to two feature sets having a high similarity, is small. In contrast, the distance between adjacent lattices that are each prototyped to two feature sets having a low similarity is large. Considering a three-dimensional surface with the height representing the magnitude of the distance, the height of a surface corresponding to a distance between lattices each prototyped to feature sets having a high similarity will be low and a "valley" is formed, whereas the height of a surface corresponding to a distance between lattices prototyped to feature sets having a low similarity will be high and a "hill" is formed. Therefore, by forming the boundaries along the "hills", it is possible to define a group (cluster) of lattices that are prototyped to feature sets having a high similarity. The U-matrix method can be considered as a method for compensating a disadvantage of the self-organizing map that the distance in the input space is not preserved.

The U-matrix method, however, suffers a problem in that although it is possible to define the boundaries when the height differences between the "hills" and "valleys" are significant, in many actual information processes, the height differences between the "hills" and "valleys" are not as significant as desired, and the height of the three-dimensional surface varies rather gradually. In such cases, manual setting of the boundaries is necessary. Therefore, the U-matrix method in some cases does not allow autonomous determination of boundaries.

The "potential method" is disclosed in D. Coomans, D. L. Massart, Anal. Chem. Acta., 5-3, 225-239 (1981). In the potential method, a probability density function of a population which approximately represents input data is estimated using a predetermined potential function and by superposing a value of a function corresponding to input data, and the regions where the amount of superposition is small are determined as the boundaries. As the potential function, a Gaussian type function is commonly used. More specifically, for a group of input data made of N input vectors each having K dimensions, average potentials received by first input data from the other input data (contribution of the first input on the overall input group) $\psi_1$ is defined using the following equations (2) and (3).

[Equation 4]

$$\Psi_i = N^{-1} \sum_{g=1}^{N} \Phi_{l,g} \tag{2}$$

$$\Phi_{l,g} = [(2\pi)^{K/2} \cdot \alpha^K]^{-1} \exp[-(2\alpha)^2)^{-1} \sum_{k=1}^{K} (x'_{kl} - x'_{kg})^2] \tag{3}$$

wherein $$x'_{kl} = \frac{(x_{kl} - \bar{x}_k)}{\sigma_k}, \bar{x}_k = N^{-1} \sum_{l=1}^{N} x_{kl}, \sigma_k = \left[\sum_{l=1}^{N} (x_{kl} - \bar{x}_k)^2 (N-1)\right]^{1/2}$$

In these equations, $x_{kl}$ represents a k-th component of the first input and $\alpha$ represents a smoothing parameter which affects the number of clusters to be classified. Therefore, in the potential method, optimization of distribution function for which the distribution shape is to be assumed and optimization of various parameters are required for each input vector group, that is, knowledge concerning the characteristics of the data to be classification is required in advance, and manual adjustment is therefore required. In addition, in the potential method, as the dimension of the feature set obtained from the input data becomes higher, more samples will be required for determining the appropriate probability density distribution, and therefore the potential method suffers from a problem in that it is difficult to apply the method to a map having only a small number of lattices. In other words, the potential method also does not always ensure autonomous determination of boundaries.

To solve the above-described problems, various techniques have been studied, such as the techniques disclosed in Japanese Patent Laid-Open Publication No. Hei 7-234854, Japanese Patent Laid-Open Publication No. Hei 8-36557, and "Unsupervised Cluster Classification using Data Density Histogram on Self-Organizing Feature Map", papers of the Institute of Electronics, Information, and Communication Engineers, D-II Vol. J79-DII No. 7, pp. 1280-1290, July, 1996. However, each of these techniques presumes that the features to be used for the classification are prototyped to lattices with sufficient distance either in the structure of the input data or in the mapping results. When there is variation in a difference between or an overlapping of distribution shapes for each feature to be classified or in the distance between center of masses of the positions on the map of lattices which are prototyped to the feature, which are common to image data classification, for example, the boundaries of clusters become mingled in a complicated manner on the map and appropriate clustering process cannot be performed.

In addition, in the related art methods, the number of lattices on the map is determined through research and experience in, and there has been no consideration regarding selection of an appropriate number of lattices suitable for actual usage. However, when the number of lattices is less than an appropriate number, there are some cases where the lattices in the section of the cluster boundaries become strongly associated with a feature set which should belong to another cluster, in which case classification error tends to occur more frequently. For this purpose, a technique for increasing or decreasing the number of lattices such that the average quantization error becomes lower than a predetermined number is disclosed in James S. Kirket al., "A Self-Organized Map with Dynamic Architecture for Efficient Color Quantization", IJCNN '01, 2128-2132. In this technique, however, lattices that image data distribution in the space of a feature set corresponding to the input data are added and the like, and there is no consideration for increasing, for example, the number of lattices in the neighborhood of the cluster boundaries, which is important in data classification. As such, it is also possible to increase the number of lattices from the beginning of the process, but this configuration inevitably leads to an increase in calculation time, and therefore, is not practical.

Similarly, when, for example, input data (pattern data) is to be directly classified into clusters without the use of prototypes, there is a method for classifying a group of pattern data into clusters based on statistical characteristics in the group of pattern data. Regarding the statistical characteristics, for example, various methods are known such as a method wherein the statistical distribution parameters are sequentially estimated through Bayes' learning and a method using a potential function. However, estimation of the statistical characteristics in this manner requires that information (for example, label) which acts as a hint for clustering be added to the input pattern data, because the pattern data must be provisionally classified for each hint information and the estimation for the statistical distribution is calculated for each classification.

To this end, it is also possible to calculate degrees of similarity between individual pattern data using a predetermined function, analyze the structure of pattern data space, and apply a clustering process according to the structure resulting from the analysis. As this type of method, a K-means method and a dividing and merging method (commonly referred to as the "ISODATA method") are known, but these methods require manual setting of parameters. More specifically, in the K-means method, a final cluster number indicating the number of clusters into which the group of pattern data is to be divided must be manually set. There is also a problem in that the clustering result is highly sensitive to the setting of a parameter known as a cluster center value and that the quality of the clustering results is determined based on the set values.

Similarly, in the dividing and merging method, parameter settings for a number of parameters such as a cluster removal threshold value, a cluster division threshold value, and a cluster merge threshold value are required and the clustering results are significantly affected by the setting of these parameters.

The present invention was conceived to solve the above-described problem and an advantage of the present invention is that a data classifier is provided in which autonomous clustering process can be performed.

SUMMARY OF THE INVENTION

According to one aspect of the present invention, there is provided a data classifier for classifying a plurality of input pattern data into one or more clusters, wherein initially, for each pattern data, a cluster to which the pattern data belongs is provisionally determined; for each cluster, a predetermined correlation value is calculated between one or more pattern data belonging to the cluster and observational pattern data which is a target to be classified into a cluster; and a cluster to which the observational pattern data belongs is determined based on the correlation value.

According to another aspect of the present invention, there is provided a data classifier for classifying a plurality of input pattern data into one or more clusters, wherein initially, for each pattern data, a cluster to which the pattern data belongs is provisionally determined; for each cluster, each degree of similarity between each pattern data belonging to the cluster and observational pattern data which is a target to be classified into a cluster is determined using a predetermined function and a correlation value is calculated by summing the values of each degree of similarity; and a cluster to which the observational pattern data belongs is determined based on the correlation value for each cluster.

According to another aspect of the present invention, it is preferable that, in the data classifier, the predetermined function is defined including a parameter based on an occurrence frequency distribution of a degree of similarity of pattern data or a parameter based on a statistical value of the values of the degree of similarity for each pattern data with other pattern data. According to another aspect of the present invention, it is preferable that, in the data classifier, the predetermined function is a function wherein the value relatively rapidly and asymptotically approaches a minimum value with a decrease in the degree of similarity.

According to still another aspect of the present invention, there is provided a data classifier for classifying a plurality of input pattern data into one or more clusters, wherein (a) for each pattern data, a cluster to which the pattern data belongs is provisionally determined; (b) each pattern data is sequentially selected as observational pattern data which is to become a target to be classified into a cluster; (c) for each cluster, a predetermined correlation value is calculated between one or more pattern data belonging to the cluster and the observational pattern data which is a target to be classified into a cluster; (d) a cluster to which the observational pattern data should belong is determined based on the correlation value; and the processes of (b), (c), and (d) are repeated until there is no change in the cluster to which each pattern data should belong, and each pattern data is classified into a cluster.

According to another aspect of the present invention, there is provided a data classification method for classifying a plurality of input pattern data into one or more clusters, comprising the steps of provisionally determining, for each pattern data, a cluster to which the pattern data belongs; calculating, for each cluster, a predetermined correlation value between one or more pattern data belonging to the cluster and observational pattern data which is a target to be classified; and determining a cluster to which the observational pattern data belongs based on the correlation value.

According to another aspect of the present invention, there is provided a data classification method for classifying a plurality of input pattern data into one or more clusters, comprising the steps of provisionally determining, for each pattern data, a cluster to which the pattern data belongs; for each cluster, determining, using a predetermined function, a degree of similarity between each pattern data belonging to the cluster and observational pattern data which is a target to be classified into a cluster and calculating a correlation value by summing the values of the degree of similarity; and determining a cluster to which the observational pattern data belongs based on the correlation value for each cluster.

According to another aspect of the present invention, there is provided a data classification program which, when executed, causes a computer to classify a plurality of input pattern data into one or more clusters by executing the steps of provisionally determining, for each pattern data, a cluster to which the pattern data belongs; calculating, for each cluster, a predetermined correlation value between one or more pattern data belonging to the cluster and observational pattern data which is a target to be classified into a cluster; and determining a cluster to which the observational pattern data belongs based on the correlation value.

According to another aspect of the present invention, there is provided a data classification program which, when executed, causes a computer to classify a plurality of input pattern data into one or more clusters by executing the steps of provisionally determining, for each pattern data, a cluster to which the pattern data belongs; for each cluster, determining, using a predetermined function, a degree of similarity between each pattern data belonging to the cluster and observational pattern data which is a target to be classified into a cluster and calculating a correlation value by summing the values of the degree of similarity; and determining a cluster to which the observational pattern data belongs based on the correlation value of each cluster.

BRIEF DESCRIPTION OF THE DRAWINGS

FIG. 6 is an explanatory diagram showing an example operation of the clustering process.

FIG. 7 is an explanatory diagram showing an example result of clustering in a prototype map.

FIG. 8 is an explanatory diagram showing an example prototype addition process and example results of clustering after addition of prototypes.

DESCRIPTION OF PREFERRED EMBODIMENT

A preferred embodiment of the present invention will now be described with reference to the drawings. In the following description, the embodiment is illustrated using an example wherein image data is classified, but the present invention is not limited to image data classification and can also be applied to classification of data from other sensory organs, such as taste data, or to measurement data such as experimental results.

Figure 1:
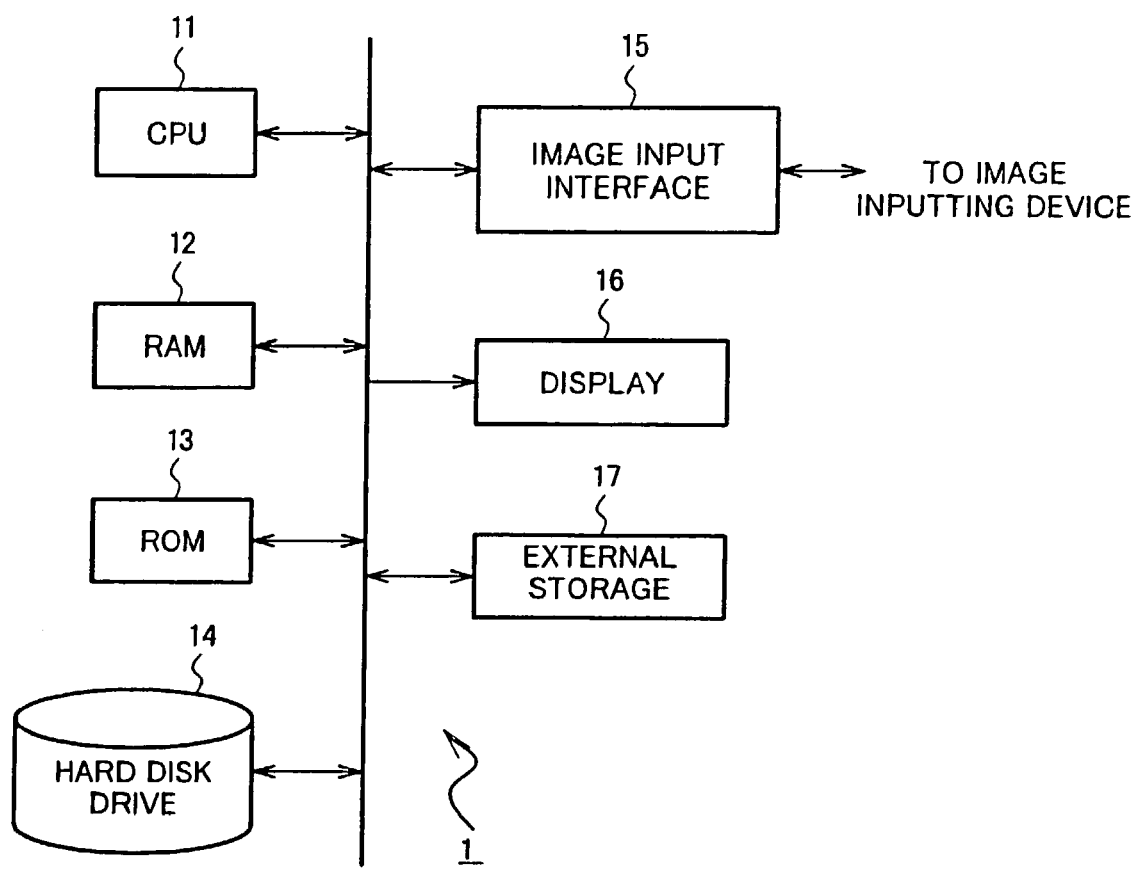
FIG. 1 is a block diagram showing a structure of a data classifier according to a first preferred embodiment of the present invention.

As shown in FIG. 1, a data classifier according to the preferred embodiment of the present invention comprises a CPU 11, a RAM 12, a ROM 13, a hard disk drive 14, an interface 15 for image input, a display 16, and an external storage 17 which are connected to each other via a bus. In other words, the data classifier 1 according to the embodiment is realized as a software classifier operating on commonly used personal computers. This software can be stored and distributed in storage media such as CD-ROMs and DVD-ROMs, or, alternatively, may be downloaded through a network (a connection interface for the network is not shown). When the software is distributed on the storage media, the software is read at the external storage 17 and stored in the hard disk drive 14 through a predetermined installation procedure. When the software is downloaded through a network, the software is installed to the hard disk drive 14 in a similar manner.

CPU 11 operates according to a program stored in the hard disk drive 14 and generally executes a data classification program or the like for realizing the data classifier 1 of the embodiment under a control of an operating system such as Microsoft Windows™.

The RAM 12 is utilized as a work memory for the CPU 11 and stores various parameters and data while the CPU 11 is in operation. The ROM 13 primarily stores programs required for activating the data classifier, such as a program for reading process of the operating system. These activation programs are well known in the art and will not described in detail.

On the hard disk drive 14, the main portion of the operating system and various programs are installed. In the embodiment, as described above, the data classification program is also installed to the hard disk drive 14. Although embodiment is described exemplifying a case wherein the data classification program is installed on the hard disk drive, it is also possible for the data classification program to be installed on an SRAM (Static Random Access Memory) or an on volatile memory such as EEPROM. In addition, the program need not be installed in the same casing as the CPU 11, and may be installed to another computer which is connected via a network interface (not shown).

An image inputting device such as a scanner is connected to the image input interface 15. The image input interface 15 receives image data input from the image inputting device and outputs the image data to the CPU 11. The display 16 displays an image according to instructions from the CPU 11.

First Embodiment

A first embodiment will now be more specifically described wherein prototypes representing each input pattern data are generated for input pattern data, the prototypes are classified on a map, and the group of prototypes classified on the map are supplied for classification of input pattern data. A data classification program according to the present embodiment comprises a map generator 21 and a cluster boundary determiner 22. The map generator 21 comprises an SOM learner 31, a map selector 32, a learning condition setter 33, and a prototype adder 34. Here, each component is realized as a software module, but each component may alternatively be realized as a hardware such as a logical circuit. The processes at the CPU 11 will be described in more detail later.

[Details of Process]

Figure 2:
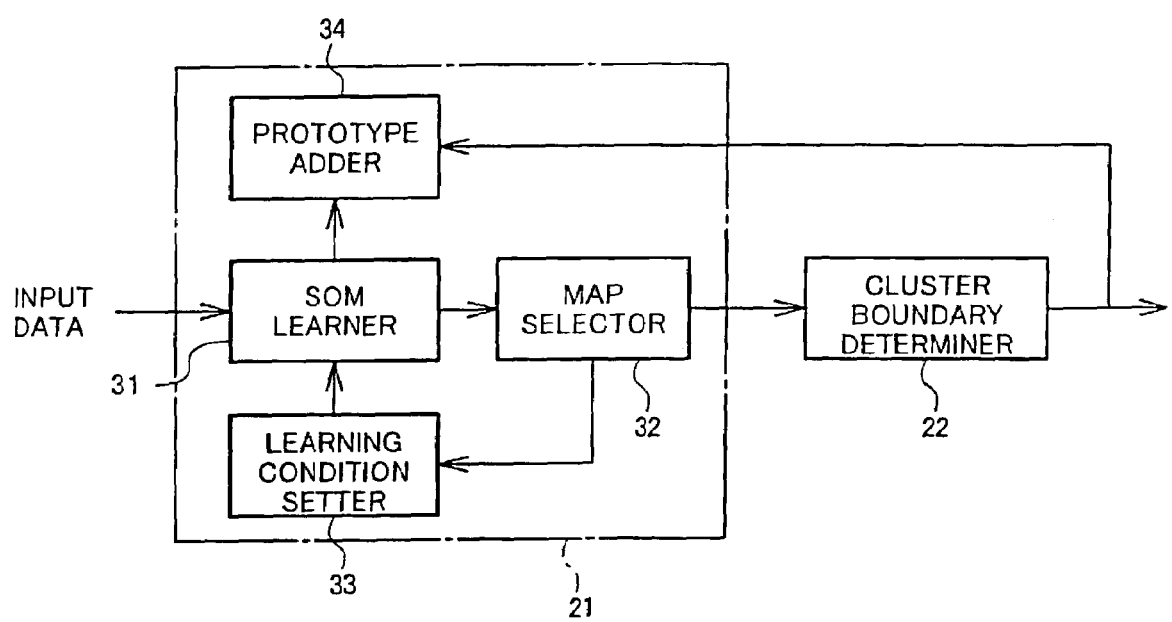
FIG. 2 is a block diagram showing a structure within a data classifier according to the first preferred embodiment of the present invention.

Details of the data classification program to be executed by the CPU 11 will now be described with reference to FIG. 2. The map generator 21 creates a prototype map, for example, through a self-organizing mapping (SOM) as described above and outputs information on the created prototype map to the cluster boundary determiner 22. The cluster boundary determiner 22 operates on the prototype map input from the map generator 21 and classifies prototypes into clusters. Each of these components will now be described separately and in detail.

[Map Generation]

The SOM learner 31 of the map generator 21 first generates a plurality of (for example, M wherein M is an integer greater than or equal to 2) candidates for a prototype map corresponding to each of M sets of learning conditions input from the learning condition setter 33. Each map candidate is prepared by associating, to information specifying each prototype, information on relative weighting of the prototype and each of the components of a feature set. In the embodiment, the prototypes composing the map need not necessarily be arranged as lattice points (in this case, the information specifying a prototype may include coordinate information of the prototype on the map), although in the following description, the prototypes are described as being arranged as lattice points in order to simplify the description.

The map selector 32 calculates a quantization error (hereinafter abbreviated as "QE") and topological product (hereinafter abbreviated as "TP") for each map candidate and selects a map suitable for cluster determination as a champion map based on these parameters. The quantization error is calculated according to the following equation (4).

[Equation 5]

$$QE_i = \frac{1}{P}\sum_{j=1}^{P} \|E_j - W_{ci}\| \quad (4)$$

In the equation (4), P represents the number of feature sets used for map learning (that is, the number of learning patterns), Ej represents a j-th vector of the feature set, Wc represents the weight vector of the winning node for the j-th vector of the feature set. The quantization error is well known, for example, from Kohonen, and will not be described in detail.

TP is calculated according to the following equation (5).

[Equation 6]

$$TP = \frac{1}{N(N-1)} \sum_{j=1}^{N} \sum_{k=1}^{N-1} \log(T(j,k)) \quad (5)$$

wherein $$T(j,k) = \left(\prod_{l=1}^{k} Q_1(j,l)Q_2(j,l)\right)^{\frac{1}{2A}}$$

$$Q_1(j,k) = \frac{d(w_j, w_{j(k,A)})}{d(w_j, w_{j(k,V)})}$$

$$Q_2(j,k) = \frac{d(r_j, r_{j(k,A)})}{d(r_j, r_{j(k,V)})}$$

Here, rj represents the coordinate of node j in the SOM competitive layer, j(k,A) represents a k-th closest node from a node j in a competitive layer A, d(i, j) represents a Euclid distance between nodes i and j, wi represents a weight vector for a node i in the SOM competitive layer, and j(k, V) represents a k-th closest node from node i in terms of the Euclid distance of the weight vector.

The TP becomes smaller as the relative positional relationship between the space in the input layer (feature set space) and the space in the competitive layer (prototype space) becomes more similar, as detailed by Bauer et al. in, for example, Bauer, H. U., and Pawelzik, K. R., (1992), "Quantifying the neighborhood preservation of self-organizing feature maps." IEEE Trans., Neural Networks, 3, 570-579.

The map selector 32 utilizes the QE and TP, and selects, as the champion map MAPc, a map having a minimum score value as calculated using the following equation (6) and outputs the selection result.

[Equation 7]

$$\left(\frac{|TP_i|}{TP^*}\right) \times \left(\frac{QE_i}{QE^*}\right) \quad (6)$$

Here, TP* represents a median of the absolute values of TPi, that is, TP*=median{|TP1|, ... |TPM|}. Similarly, QE* can be represented as QE*=median{|QE1|, ... |QEM|}. That is,

[Equation 8]

$$MAP_c = \min_i \left\{\left(\frac{|TP_i|}{TP^*}\right) \times \left(\frac{QE_i}{QE^*}\right)\right\}$$

The map selector 32 does not immediately output the selection result of the champion map to the cluster boundary determiner 22 provided in downstream of the map selector 32, but instead outputs one or more signal to the learning condition setter 33. After repeating this process a predetermined number of times, the map selector 32 then outputs the selection result at that point to the cluster boundary determiner 22.

The learning condition setter 33 outputs, for example, M sets of data, each set including a number of input data for learning N (number of repetitions of learning), a neighborhood distance σ(t), and a learning coefficient α(t). The learning condition setter 33 initially determines these values and a function (N, σ(t), α(t)) based on random parameters or as a set which is determined in advance (hereinafter referred to simply as "preset"). The learning condition setter 33 also receives an input of selection result of the champion map from the map selector 32 and extracts a set of learning conditions corresponding to the selected map candidate. Using the extracted set of learning conditions as a basis, the learning condition setter 33 creates and assigns M sets of learning conditions and outputs these to the SOM learner 31.

The prototype adder 34 is provided for adding a prototype to a predetermined position on the prototype map after the cluster boundaries are determined to allow a further learning process. This component will be described in more detail later as this component is also associated with the operation of the cluster boundary determiner 22.

The learning operation at the map generator 21 will now be described. Initially, the learning condition setter 33 produces and outputs a plurality of sets (for example, M sets) of learning conditions based on parameters which are set randomly or determined in advance. The SOM learner 31 generates M candidates for a prototype map (map candidates) each corresponding to each learning condition set output from the learning condition setter 33 and outputs the map candidates to the map selector 32. The map selector 32 selects, from among the map candidates, a map in which the learning conditions are preferable for the clustering process using both the quantization error and TP (champion map), and outputs the selection result to the learning condition setter 33. The learning condition setter 33 creates a plurality of sets of new learning conditions based on the learning conditions used for creating the champion map, and again outputs the created sets of learning conditions to the SOM learner 31 for creating another plurality of map candidates.

In this manner, the steps of creation of map candidates, selection of a champion map, and resetting of learning conditions are repeated a predetermined number of times, and a resulting champion map is output to the cluster boundary determiner 22 as a map in which the cluster boundaries are to be set (hereinafter referred to as a "boundary setting map").

[Determination of Cluster Boundaries]

Figure 3:
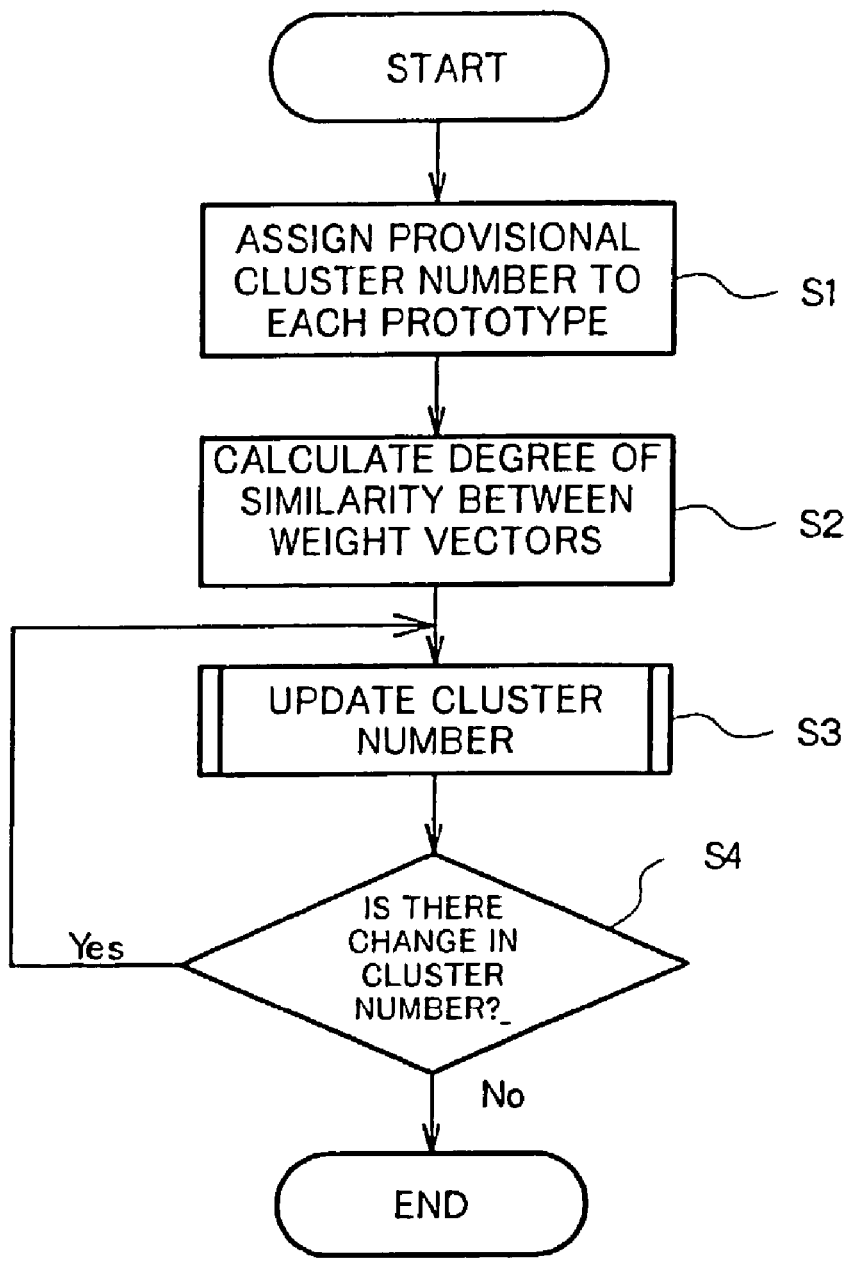
FIG. 3 is a flowchart showing a clustering process.

The cluster boundary determiner 22 executes processes as exemplified in FIG. 3 using the map input from the map generator 21 as the boundary setting map. More specifically, the cluster boundary determiner 22 assigns a unique number to each of prototypes contained in the input map and generates a provisional clustering result (S1). These numbers may be assigned by assigning numbers from "1" to "P" (with the number of prototypes being P) in a predetermined order. These numbers represent provisional cluster numbers. In other words, initially, the prototypes are classified into clusters which differ from each other.

Then, the cluster boundary determiner 22 chooses a prototype pair and calculates a degree of similarity (Cd) between the weight vectors of the prototypes in the chosen prototype pair (S2). The result of this calculation is stored in the RAM 12 as a table for degree of similarity. A "prototype pair" referred to herein includes prototype pairs obtained by sequentially selecting a prototype as an observational prototype and combining the observational prototype with all of the other prototypes, that is, all combinations of two prototypes. In addition, as the degree of similarity referred to herein, a squared sum (distance) of the differences for the corresponding components of the weight vectors is used.

Figure 4:
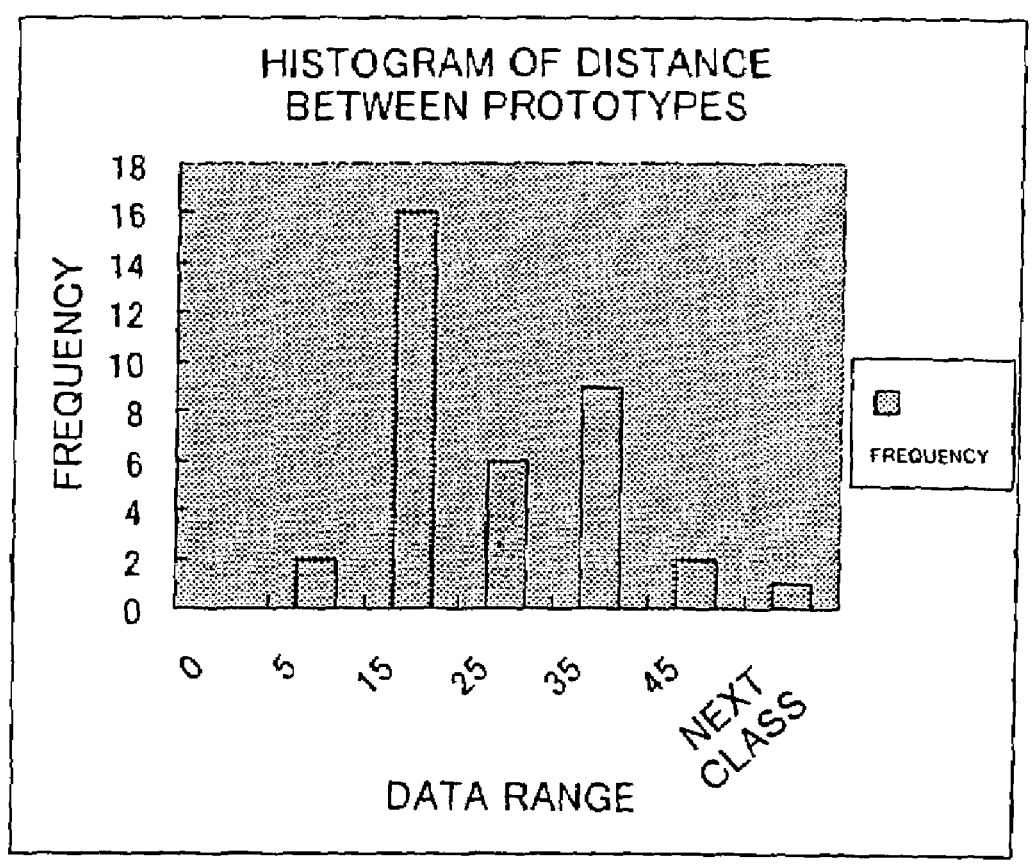
FIG. 4 is an explanatory diagram showing an example detection of histogram of distance between prototypes.

The degree of similarity is classified into classes each having a predetermined range of numerical values, and information on occurrence frequency for each class is generated (FIG. 4). A distance wherein the occurrence frequency is the maximum is set as Cd and a predetermined minute amount δ which is close to "0" is determined, or, alternatively, a distance which is shorter than the distance where the occurrence frequency is maximized and which is a maximum of where the occurrence frequency changes from decreasing to increasing may be set as Cd.

Figure 5:
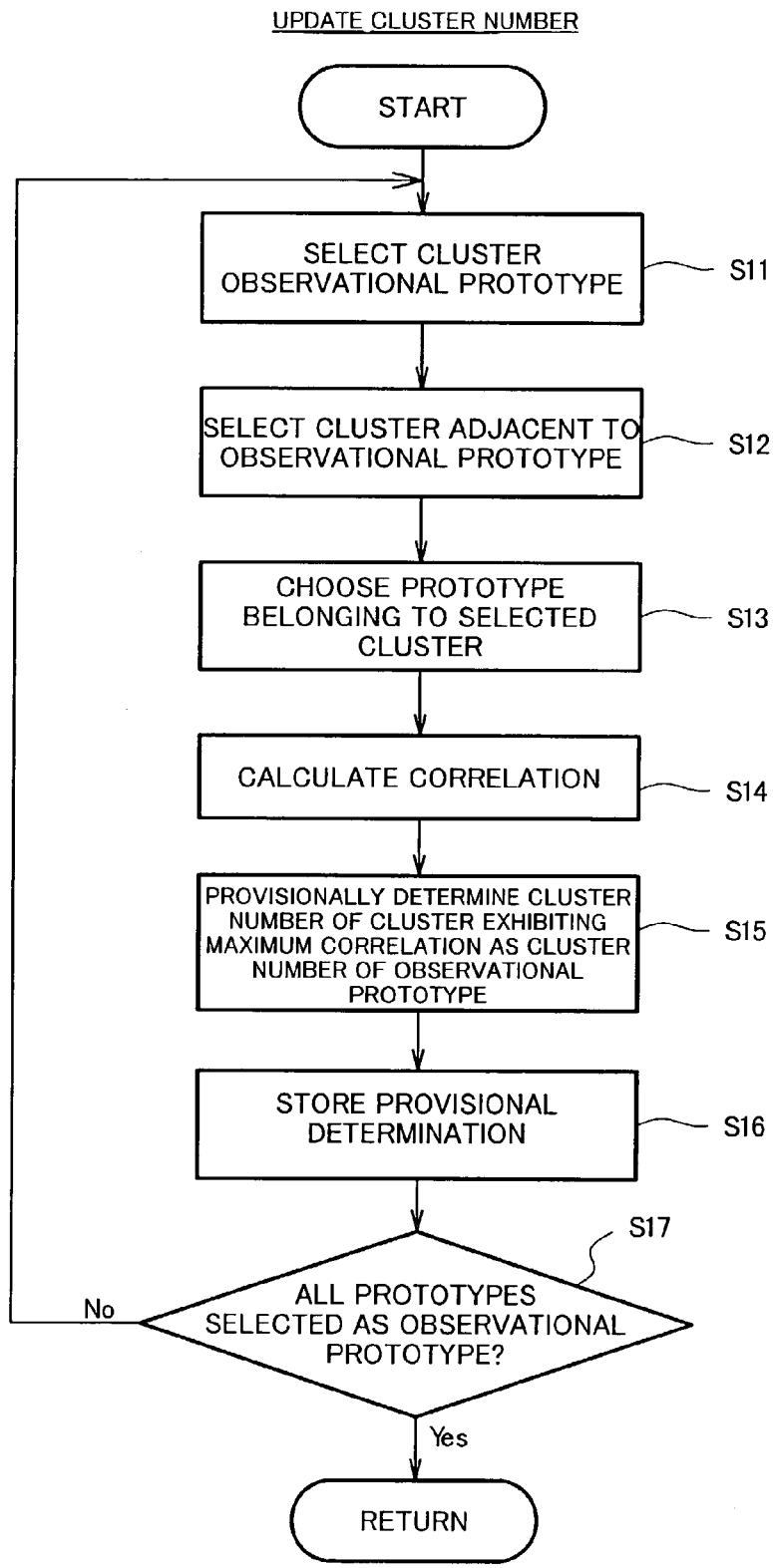
FIG. 5 is a flowchart showing an example update process in the clustering process.

Next, a process for updating the cluster numbers is started (S3). The cluster number update process is as shown in FIG. 5. In order to simplify the description, the process is explained here using an example wherein a 3×3 lattice map is used as the prototype map for which the cluster boundaries are to be determined. Initially, for the prototype map, unique numbers of "1" through "9" are assigned to 3×3=9 prototypes as shown in the a-state of FIG. 6 at the process S1.

The cluster boundary determiner 22 sequentially selects a prototype as an observational prototype (S11). Then, the cluster boundary determiner 22 selects a cluster to which a prototype adjacent to the observational prototype belongs (within a predetermined distance on the prototype map for which cluster boundaries are provisionally determined) (S12) and chooses the prototype which belongs to the selected cluster (S13).

In the example shown in FIG. 6, for example, the "1" on the left bottom is selected as the observational prototype, and for each of the adjacent cluster numbers "1", "4", "5", and "2", prototypes that belong to each cluster are selected. Then, the cluster boundary determiner 22 calculates correlation between each prototype belonging to the clusters selected in process S12 and the observational prototype as a measure using the following equation (7) (which is a function rapidly and asymptotically approaching "0" from a predetermined differential value with the decrease in the degree of similarity) (S14) and determines the cluster to which the observational prototype belongs based on the correlation.

[Equation 9]

$$F(c) = \frac{\sum_{i \in \chi(c)} e^{-\alpha \|y^* - y_{ic}\|^2}}{\sum_{j \in \chi} e^{-\alpha \|y^* - y_j\|^2}} \tag{7}$$

wherein $$\alpha = -\frac{Ln(\delta)}{Cd} \tag{8}$$

In equation (7), $y^*$ represents the weight vector of the observational prototype, yi represents the weight vector of the i-th prototype, and χ represents a group of prototype vectors with χ(c) representing the group of prototype vectors in cluster number c, the parameters Cd and δ used for determining α is obtained at the process S2, and Ln represents the natural logarithm. In other words, in equation (7), the sum of the distances between the observational prototype and the prototypes belonging to the cluster having the cluster number of c is divided by the overall average. Equation (7) therefore represents correlation between the observational prototype and the cluster c, and exhibits a larger value for a cluster c which includes a larger number of prototypes having weight vectors with large correlation with the weight vector of the observational prototype.

The cluster boundary determiner 22 provisionally determines, as the cluster number of the observational prototype, the number of cluster which exhibits the maximum value for equation (7) (S15) and stores the provisional determination (S16).

When the prototype classified into the cluster "1" in the a-state of FIG. 6 is the observational prototype, for example, as an adjacent prototype, initially no prototype other than the observational prototype belongs to cluster "1" and no calculation is performed regarding cluster "1". Correlations between the observational prototype and prototypes belonging to cluster "4", between the observational prototype and prototypes belonging to cluster "5", and between the observational prototype and prototypes belonging to cluster "2" are calculated, and when, for example, the shortest distance is observed between the observational prototype and the prototype belonging to the cluster "4", the cluster to which the observational prototype belong is changed from cluster "1" to cluster "4" (b-state in FIG. 6). It is also possible to perform the correlation calculations with all prototypes instead of performing the calculations with the adjacent prototypes. With such a configuration, it is possible to gather prototypes that are farther away on the prototype map, but which have relatively short distances in terms of the weight vectors. However, as this configuration requires longer period of time, in the embodiment, a map has been selected in which the distances on the prototype map are not too far different from the distances in terms of the weight vectors by considering evaluation using TP in advance.

The cluster boundary determiner 22 then checks whether all prototypes have been selected as an observational prototype (S17), and if there is any prototype which has not been selected (if No), the process returns to S11 and continues from there. If it has been determined at process S17 that all prototypes have been selected (if Yes), the update process of the cluster number is completed.

The cluster boundary determiner 22 returns to the process shown in FIG. 3 and compares the provisional determination with the cluster numbers before the update process to check whether or not there had been any change in the cluster numbers (whether or not the cluster numbers have been converged) (S4). If there has been any change (if Yes), the process S3 is repeated using the provisional determination as a new provisional clustering result. If it has been determined that there has been no change (if No) in the process S4, that is, if the cluster numbers are converged, the cluster boundary determiner 22 outputs the obtained clustering results.

As an alternative method for determining Cd at step S2, it is also possible to calculate, for each observational prototype, a statistical value for the degrees of similarity between the observational prototype and the other prototypes and determine the value of Cd by applying a predetermined statistical process to the statistical value for each observational prototype. In such case, Cd may be determined using the following equation (9).

[Equation 10]

$$C_d = \min_k \{D_k\}, k = 1, 2, \ldots, K \quad (9)$$

wherein $$D_c = \max_i \{\|y^* - y_{ic}\|^2\} \times C_1$$

In the equation, k represents a cluster adjacent to the cluster to which the prototype for which the cluster is to be determined currently belongs and C1 represents a positive constant greater than "1". Determining Cd using equation (9) ensures that all prototypes belonging to one or more of the adjacent clusters influence the prototype for which the cluster is to be determined. This determination also allows for adaptive determination of suitable Cd for individual prototype.

[Addition of Prototype]

A feature of the embodiment is that the clustering boundary determiner 22 does not immediately output the clustering result as the final result, but rather the clustering boundary determiner 22 can generate one or more output to the prototype adder 34 of the map generator 21. The prototype adder 34 creates a new prototype in the section of boundaries of the clusters by referring to the clustering result and outputs, to the SOM learner 31, a prototype map after the new prototype is added so as to allow a further learning process. This further learning is targeted for fine adjustment, and therefore if, for example, the learning conditions for the learning process before clustering are set as α(t)=0.2, σ(t)=2.0, and 10000 learning steps for 700 patterns, the learning process after the new prototype is added can have, for example, learning conditions such as α(t)=0.002, σ(t)=1.0, and 100 repetition of pattern input.

More specifically, when, for example, the cluster boundary determiner 22 outputs a clustering result as shown in the c-state of FIG. 6 for a prototype map which is provisionally clustered initially as the a-state of FIG. 6, a new prototype is formed at the boundary between clusters "4" and "6" (d-state of FIG. 6). In d-state of FIG. 6, the previous clustering results are shown in parentheses to facilitate the understanding, but these previous clustering results are meaningless after the prototype has been added.

The new prototype need not be added in the entire region along the cluster boundaries and may instead be added in at least a portion along the cluster boundaries. In this case, it is preferable to determine the portion to which a prototype is to be added based on the number of instances (number of patterns) in which the portion became a closest-neighboring prototype having the shortest distance with respect to the learning input vector (pattern). In learning methods such as SOM learning and VQ learning, the density of prototypes at the central section of a cluster is large and the density of the prototypes is small near the cluster boundary such that the clusters can be used in the U-matrix method. Therefore, for a portion which has a relatively small number of opportunities, a number less than a predetermined threshold value, to become a closest-neighboring prototype with respect to the learning input pattern, that is, a portion where the density of the prototypes is less than a predetermined threshold value, it is possible to assume that the portion is a prototype near the boundary of the clusters. By adding a new prototype to this portion, it is possible to avoid adding new prototypes over the entirety of the boundary, and the efficiency for the re-learning and re-clustering processes can be improved.

The weight vector of the new prototype to be added is determined using a predetermined statistical calculation result (for example, arithmetic mean) with respect to weight vectors of already-existing prototypes near the position to which the new prototype is to be added (for example, the boundary).

[Operation]

Next, an operation of a data classifier 1 according to the embodiment will be described. First, the learning condition setter 33 outputs a plurality of sets of learning condition parameters S1, S2, SM and the SOM learner 31 generates a number of prototype maps, the number corresponding to the number of sets of the learning condition parameters (in this case, M). The SOM learner 31 generates a predetermined feature vector based on learning image data input from outside and adjusts coupling weights between each prototype in each prototype map and each component in the feature vector. This operation of the SOM learner 31 is well known from, for example, Kohonen et al. As the learning image data, image data of a target intended for later classification such as, for example, image data relating to "eye" or image data relating to "nose" may be used.

The plurality of prototype maps generated by the SOM learner 31 are output to the map selector 32. Based on quantization error (QE) and topological product (TP) determined through calculations relating to the prototypes included in each map, the map selector 32 selects a map in which the quantization error is small and the matching of the relative positional relationship, indicated by TP, between the space of input layer (feature set space) and the space of competitive layer (prototype space), that is, the matching between the distance between weight vectors and the distance in the competitive layer is high. With such selection, the distance on the map between prototypes which are sensitive to similar image data can be reduced.

Then, based on the set of learning condition parameters used for learning in the selected map, the learning condition setter 33 again generates a plurality of sets of learning condition parameters and outputs to the SOM learner 31. A plurality of maps are again generated and the map selection process based on QE and TP is again performed. In this manner, the learning condition parameters are recursively adjusted and the formation through learning (learning formation) of maps is recursively performed.

The cluster boundary determiner 22 operates on a map obtained through the recursive learning as described, sequentially selects a prototype on the map, and collects in a cluster the selected prototype and adjacent prototypes which have a large correlation with the selected prototype. In other words, the cluster boundary determiner 22 determines a cluster to which each prototype belongs based on the positional relationship on the map between the prototypes and the correlation between the prototypes. This process is repeated until the clustering result converges. When the clustering result converges, the clustering boundary determiner 22 outputs the converged clustering result to the prototype adder 34.

The prototype adder 34 generates a map to which a new prototype is added in the boundary portion of the clusters and outputs the generated map to the SOM learner 31 which then sets predetermined learning conditions and re-executes the learning process. In this process, only one set of learning condition parameters is required, and therefore, only one map is necessary. After the learning process for the map is completed, the map is output to the cluster boundary determiner 22 (without passing through the map selector 32) and the cluster boundary determiner 22 re-executes the clustering process.

The map obtained as a result of this clustering process is supplied for use in the classification process. In other words, a feature vector is generated for image data input as the classification target and a prototype which has the largest coupling weight with respect to the feature vector (a prototype which is sensitive to the input image data) is found. The cluster number of the cluster to which this prototype belongs is assigned as the classification number for the image data. In this manner, a specific classification number is determined for image data which are similar to each other (for example, image data relating to "eye"), and different classification numbers are determined and output for image data which differ from each other (for example, image data relating to "eye" and image data relating to "nose"). The result of this classification is displayed on the display 16 and is printed using a printer or the like (not shown).

As described, according to the present embodiment, it is possible to realize autonomous learning and clustering processes without manual setting of parameters. In addition, if the number of prototypes is insufficient, a prototype is autonomously added at the boundary portion of the clusters and learning and classification processes with appropriate number of prototypes are executed.

SPECIFIC EXAMPLE

Figure 7:
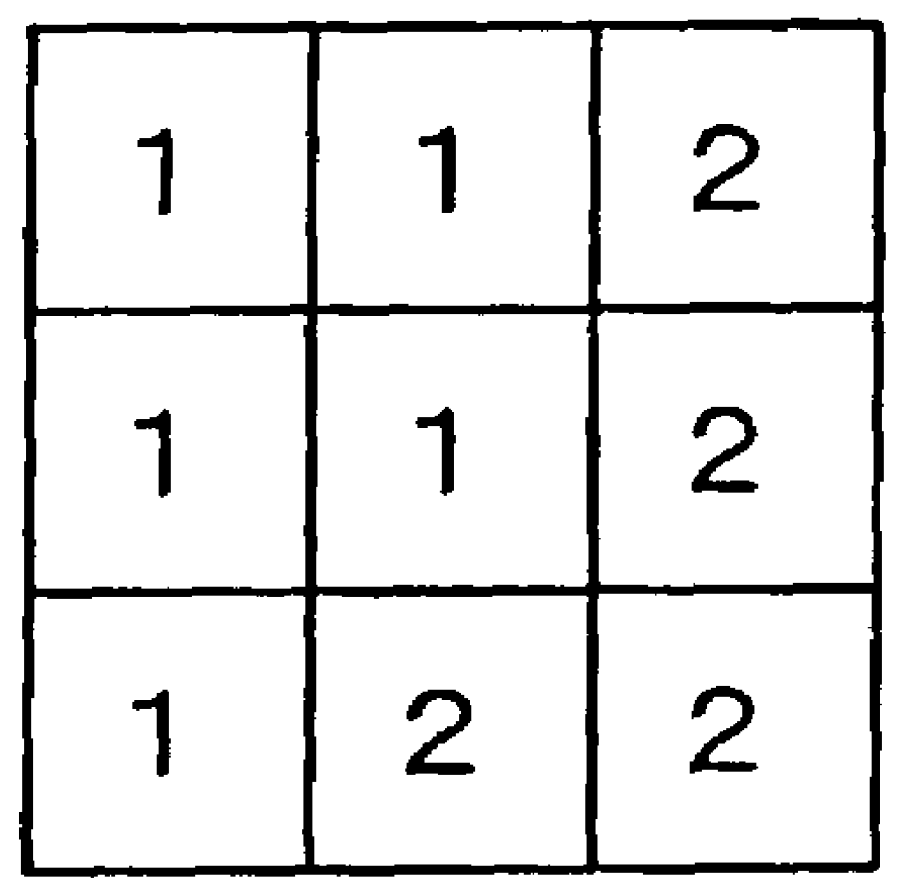

An example of addition of a new prototype according to the present embodiment will now be described. 700 image data to be classified into two categories, "eye" and "nose", were prepared and a learning process was performed using a prototype map having 3×3=9 prototypes. For simplicity, one set of learning condition parameters was used (and therefore one map was used) with the parameters set at $\alpha(t)=0.2$, $\sigma(t)=2.0$, and 10000 repetition for SOM learning using the 700 patterns. As a result of cluster boundary determination for a prototype map obtained with the above conditions, cluster boundaries as shown in FIG. 7 were formed. A data classification process was performed using this map, and it was found that 15 patterns from among the 700 patterns were erroneously classified.

Figure 8:
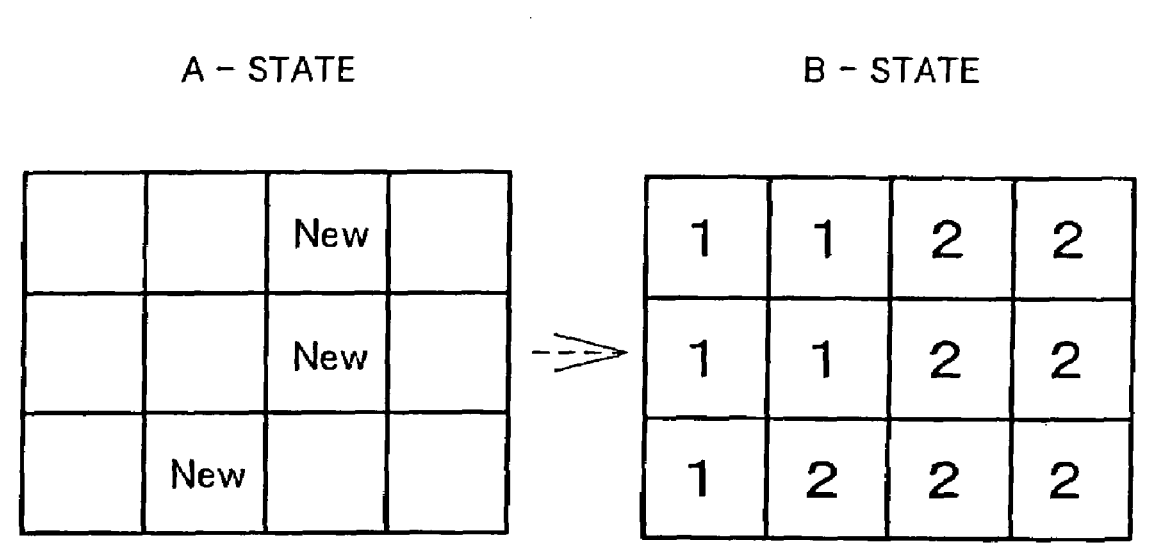

Then, new prototypes were added as shown in the a-state in FIG. 8 on the cluster boundary (represented by "New" in FIG. 8), and an additional learning process was performed with $\alpha(t)=0.002$, $\sigma(t)=1.0$, and a repetition number of pattern input of 100. The clustering boundary determination process was again executed and a clustering result as shown in the b-state of FIG. 8 was obtained. The number of erroneous classification of data according to a data classification process using this resulting map was 0. The weight vectors of the prototypes in the boundary portion were carefully studied and it was found that there was no closest-neighboring prototype for both "eye" and "nose" which are the classification targets.

In another example, cluster boundaries were determined using a map having 3×4=12 prototypes from the beginning through SOM learning with the learning condition parameters being $\alpha(t)=0.2$, $\sigma(t)=2.0$, and 10000 repetitions of inputs of 700 patterns. A data classification process using this result indicated experimentally that there were some prototypes in the boundary portion which are closest-neighboring prototypes for both "eye" and "nose", and therefore there existed some erroneous classifications. These errors resulted because, in contrast to the embodiment wherein prototypes are added in order to improve the resolution in the portion where cluster boundaries are once formed, in a method wherein a larger number of prototypes are used the learning for prototypes are performed so as to image the pattern distribution in the input space and, thus, the precision of data classification at the cluster boundary portion is not improved. In addition, in the embodiment, because the learning process is performed using a small number of prototypes initially, the time required for the initial learning process can be shortened. As described above, because the second learning process in the embodiment may be a fine adjustment with the learning condition parameters changed, the total time required for the overall learning process including both the preliminary learning and the secondary learning can be shortened compared to a learning process in which a larger number of prototypes is utilized from the beginning.

ALTERNATIVE EXAMPLE

In the above description, clusters are determined by performing a learning process through recursive adjustment of learning condition parameters and using correlations between prototypes, new prototypes are added after the preliminary cluster determination, and secondary cluster determination process is applied. It is also possible to independently apply the prototype adding technique to a learning formation of a prototype map which is already being used or to a clustering technique. In this case, in addition to SOM, VQ learning or the like may also be employed for learning of the prototype map.

In addition, although the above description exemplifies a case of classification of image data, the data classifier according to the embodiment is not limited to such a configuration and may also be applied for classification of other data.

Second Embodiments

Figure 9:
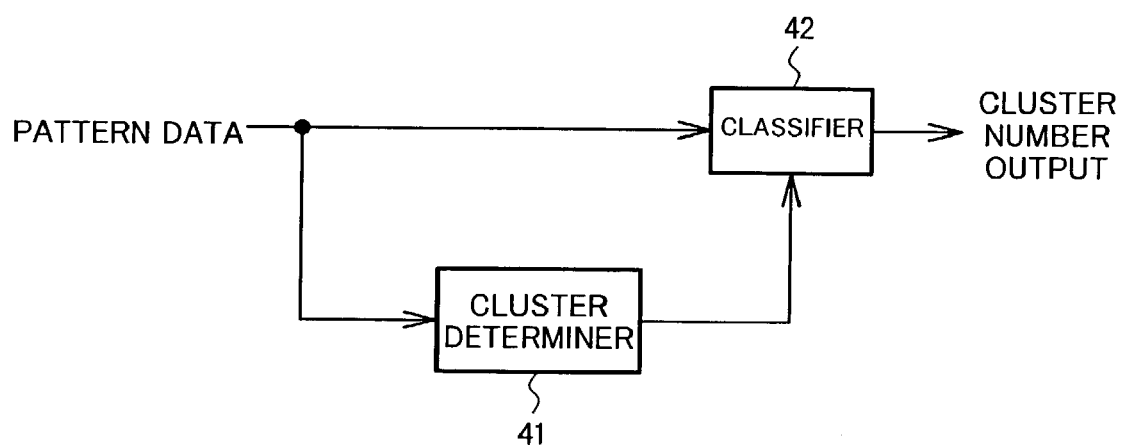
FIG. 9 is a block diagram showing a structure of a data classifier according to a second preferred embodiment of the present invention.

A second preferred embodiment of the present invention will now be described for a data classifier wherein a clustering process is directly applied to the pattern data. As show in FIG. 9, a data classification program according to the second embodiment comprises a cluster determiner 41 and a classifier 42.

The cluster determiner 41 operates during a learning process for clustering. The cluster determiner 41 executes a clustering process which will be described in more detail below to produce clustering results (commonly referred to as a "cluster filter") and outputs the clustering results to the classifier 42. The classifier 42 operates during when the actual classification process is executed. The classifier 42 stores the input clustering results (for example, stores in the hard disk drive 14), determines as to which cluster the input pattern data should belong referring to the cluster filter, and outputs the determination result as a classification result. Details of the process performed by the classifier 42 are described below.

[Details of Process]

Figure 10:
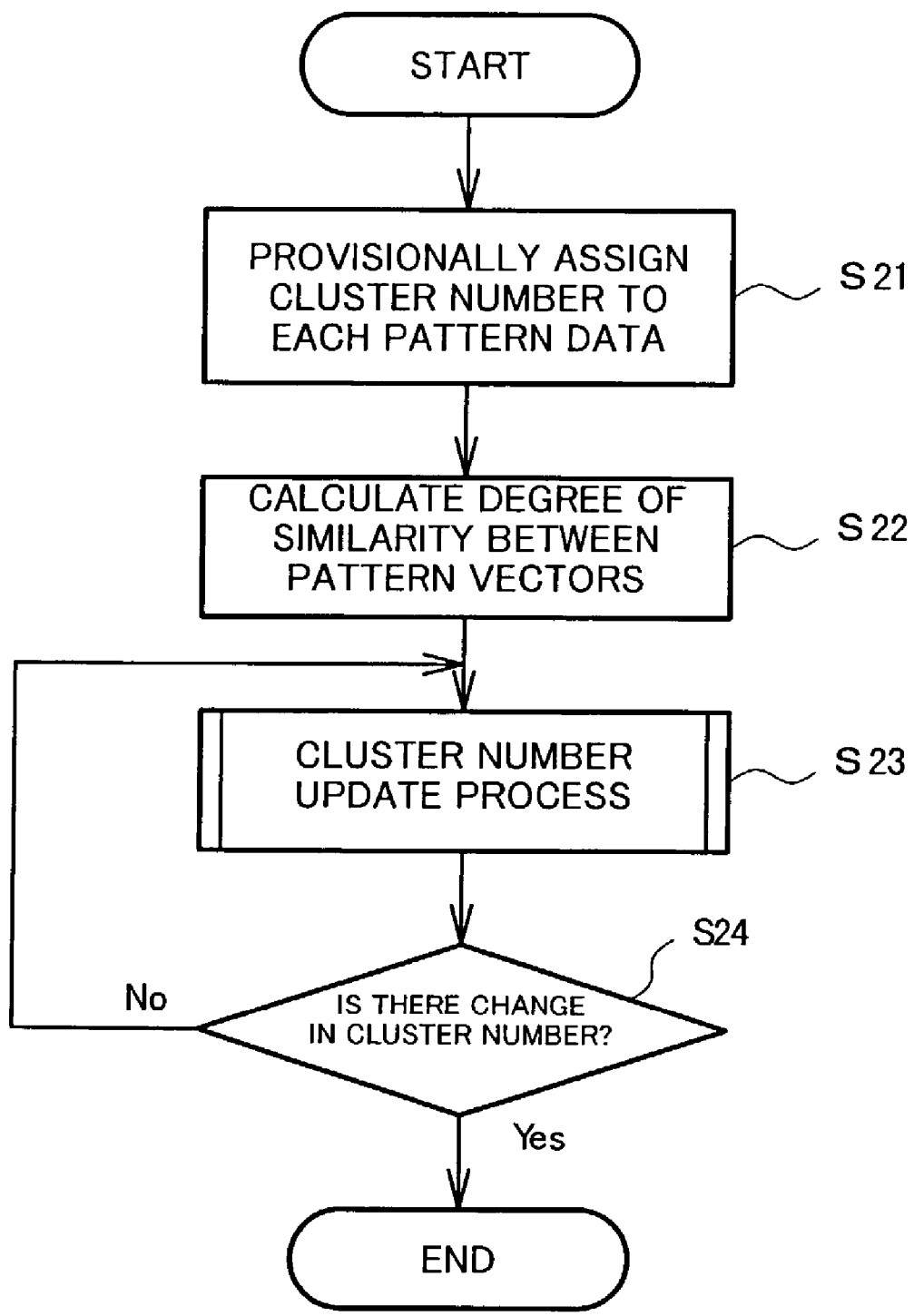
FIG. 10 is a flowchart showing a clustering process.

Details of processing of the cluster determiner 41 and the classifier 42 in a data classifier program executed by the CPU 11 will now be described. First, the process performed by the cluster determiner 41 will be described. The CPU 11 executes a process as shown in FIG. 10 for the process of the cluster determiner 41. N input pattern data are stored in the RAM 12 or in the hard disk drive 14 and numbers from "1" to "N" are provisionally assigned as the cluster number to the input pattern data in the order of input (S21). For each pattern data, a value characterizing the characteristics of the pattern data is calculated as a pattern vector. The CPU 11 stores the (provisional) cluster number and the pattern vector both with an association to the corresponding pattern data. Degrees of similarity between the pattern vectors are calculated using a predetermined function (S22). A function for calculating the degree of similarity may, for example, use a measurement between the pattern vectors, such as a squared sum of the differences in corresponding components of the pattern vectors. More specifically, combinations of two pattern data are selected from among a plurality of pattern data, a measurement between two pattern vectors of two pattern data in each combination is calculated as the degree of similarity, and the degrees of similarity are stored as a degree of similarity table in the RAM 12.

In addition, a parameter $\alpha$ which will be used later for calculation of a correlation value is calculated using equation (8). Specifically, the degrees of similarity calculated in the process of step S22 are classified into classes (a predetermined numerical range), information on occurrence frequency of each class is generated, the distance in which the occurrence frequency exhibits a maximum is determined as the Cd, a predetermined minute amount $\delta$ which is approximately equal to "0" is determined, and $\alpha$ is calculated. This process is similar to the determination of $\alpha$ by calculating the degree of similarity between prototypes as already described.

In this case also, the value of Cd may be determined, instead of as the distance in which the occurrence frequency is maximum, by calculating, for each observational pattern data, a statistical value of the degrees of similarity between the observational pattern data and the other pattern data and using the result of a predetermined statistical process (minimum of each statistical value) applied to the statistical value for each observational pattern data, that is, using the equation (9). Determination of Cd using the equation (9) ensures that all pattern data belonging to one or more clusters in the adjacent clusters influence the pattern data for which cluster is to be determined. Determination of Cd using the equation (9) also allows for adaptive determination of a suitable Cd for individual pattern data.

Figure 11:
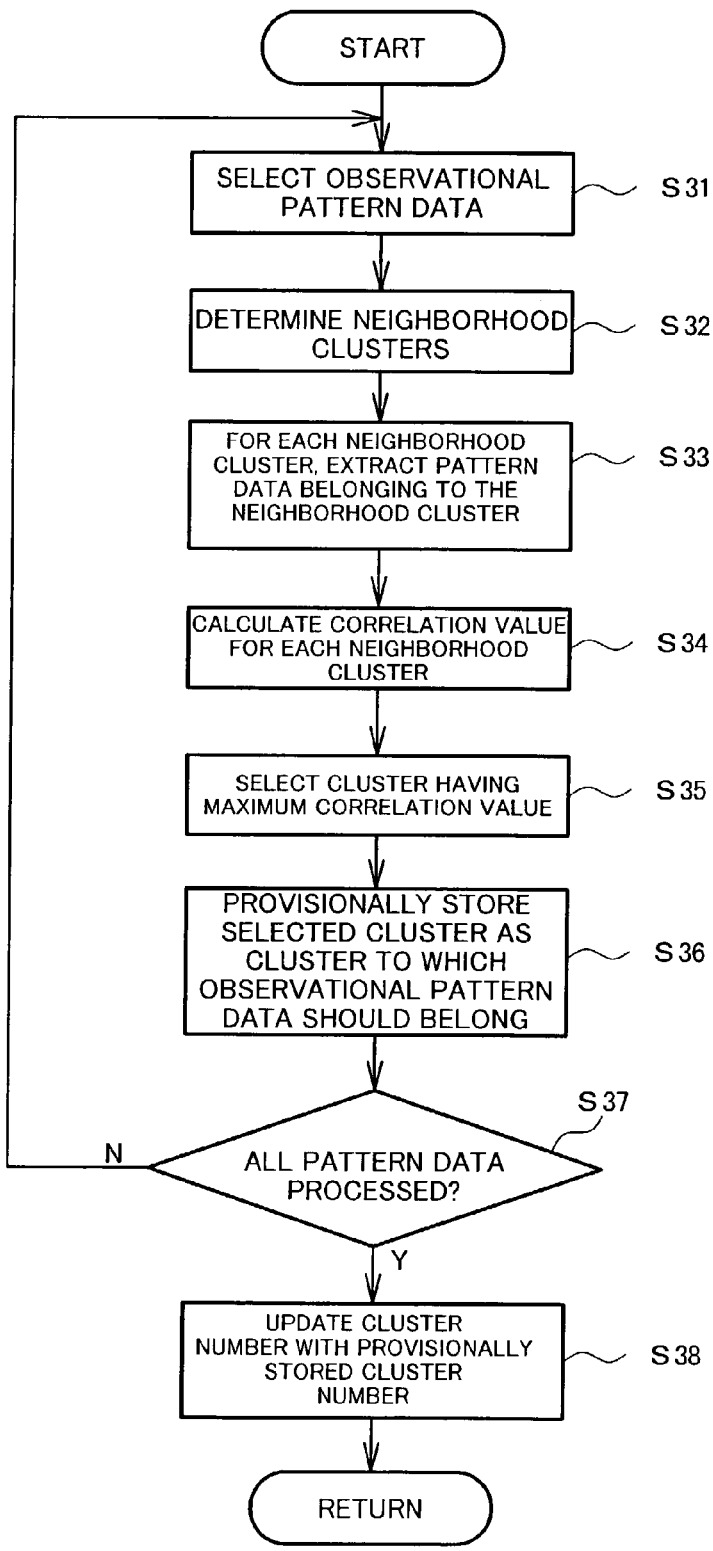
FIG. 11 is a flowchart showing a clustering process.

The CPU 11 then starts a process of updating cluster numbers (S23). An example cluster number updating process is shown in FIG. 11, and will be described in more detail below. When the cluster number updating process is completed, the CPU 11 ascertains whether or not there had been any change in the cluster numbers (whether or not clustering has converged) as a result of the process at step S23 (S24). When the CPU 11 determines that there had been a change (not yet converged; the "Yes" path in FIG. 10), the CPU 11 repeats the process at step S23. When, on the other hand, there had been no change (clustering has converged; the "No" path in FIG. 10) at the process of step S24, the process is completed and the clustering result (including information associating the pattern data and cluster number) is stored in the hard disk drive 14.

The cluster number update process of step S23 will now be described referring to FIG. 11. The CPU 11 sequentially selects each pattern data as observational pattern data (S31). The order of selection may be, for example, the order of assignment of provisional cluster numbers in step S21 (for example, the order of input). The CPU 11 then obtains the cluster number currently assigned to the observational pattern data and determines neighborhood clusters (S32). The neighborhood cluster numbers may be determined by, for example, extracting a plurality of pattern data in a decreasing order of the degree of similarity from the highest degree of similarity with respect to the observational pattern data by referring to the degree of similarity table and use the cluster numbers assigned to the plurality of extracted pattern data. The number of pattern data to be extracted may be determined in advance such as "8", or, alternatively, as a number until the number of cluster numbers determined as neighborhood clusters becomes a plurality (for example, a predetermined number such as "4"). The neighborhood clusters here include the cluster to which the observational pattern data belongs.

The CPU 11 uses the cluster numbers of the clusters determined as the neighborhood clusters and extracts, for each determined neighborhood cluster, pattern data currently belonging to the neighborhood cluster (S33). The CPU 11 then calculates, for each neighborhood cluster, a correlation value between each of the pattern data extracted from the neighborhood cluster and the observational pattern data using the equation (7) (which is a function rapidly and asymptotically approaching "0" from a predetermined differential value with the decrease in the degree of similarity) (S34). In other words, with the pattern vector of the observational pattern data as $y^*$ and the pattern vector of the ith pattern data from among the extracted pattern data as $y_i$, a value is calculated using the equation (7) wherein a sum of the distance (degree of similarity) between the pattern vector of the pattern data belonging to the cluster of cluster number c and the pattern vector of the observational pattern data is divided by the overall average. The calculated value then is determined as the correlation value between the observational pattern data and the group of pattern data belonging to the cluster number c.

The CPU 11 calculates, for each neighborhood cluster, the correlation value between the group of pattern data belonging to the cluster and the observational pattern data and selects a neighborhood cluster having the maximum correlation value (S35). The CPU 11 then associates the observational pattern data with the cluster number of the selected neighborhood cluster and stores in the RAM 12 as a provisional update result (S36).

The CPU 11 then checks whether or not all of the pattern data had been selected as the observational pattern data (S37) and, if not all of the pattern data have been selected (there exists pattern data which has not yet been selected;

"No" at S37), the process jumps back to step S31 and the CPU 11 continues the process. On the other hand, if it is determined in step S37 that there is no unselected pattern data ("Yes" at S37), the CPU 11 updates the cluster numbers currently associated to the pattern data based on the provisional update result stored in the RAM 12 (S38) and the cluster number update process is completed. Here, the update result is first maintained as a provisional update result and then the update process is executed at the end in order to prevent the update process for certain observational pattern data from influencing the determination of cluster numbers for pattern data selected as the observational pattern data at a later time.

As described, according to this second embodiment, the CPU 11 defines adjustment relationship between clusters using a distance between pattern vectors each defined for each pattern data and repeats a process of classifying observational pattern data into a cluster of higher correlation based on correlation values between a group of pattern data belonging to each cluster and observational pattern data for which cluster is to be determined (classification learning target) until there is no change in the results of clustering. Here, the neighborhood clusters are determined and then correlation values are calculated in relation with the neighborhood clusters. However, the present embodiment is not limited to such a configuration, and it is also possible to calculate the correlation values for all clusters when the processing power of the CPU 11 is sufficient for this process. In this configuration, the processes at steps S32 and S33 are no longer necessary and correlation values between pattern data in the group of pattern data belonging to each cluster and the observational pattern data are calculated at step S34 for all clusters.

Next, a process for actually classifying data using the clustering results generated as described above (process by the classifier 42) will be described. When pattern data to be classified (target pattern data) is input, the CPU 11 calculates a pattern vector (target vector) corresponding to the target pattern data and refers to the clustering result (for example, association of pattern data, pattern vector for the pattern data, and cluster number) stored in the hard disk drive 14 to calculate a distance between each of the pattern vectors contained in the clustering result (reference vectors) and the target pattern vector. The CPU 11 finds the reference vector for which the distance is minimum (reference vector having the highest degree of similarity with respect to the target pattern vector) and outputs the cluster number associated to that reference vector as a classification result.

As described, according to the second embodiment, a cluster having a high degree of correlation is autonomously found for classifying each pattern data. Because of this, an autonomous clustering process which requires no manual setting of parameters can be performed.

What is claimed is:

1. A data classifier for classifying a plurality of input pattern data into one or more clusters, wherein
    initially, for each pattern data, a cluster to which the pattern data belongs is provisionally determined;
    for each cluster, a predetermined correlation value is calculated between one or more pattern data belonging to the cluster and observational pattern data which is a target to be classified into a cluster; and
    a cluster to which the observational pattern data belongs is determined based on the correlation value for each cluster.

2. A data classifier for classifying a plurality of input pattern data into one or more clusters, wherein
    initially, for each pattern data, a cluster to which the pattern data belongs is provisionally determined;
    for each cluster, each degree of similarity between each pattern data belonging to the cluster and observational pattern data which is a target to be classified into a cluster is determined using a predetermined function and a correlation value is calculated by summing the values of each degree of similarity; and
    a cluster to which the observational pattern data belongs is determined based on the correlation value determined for each cluster.

3. A data classifier according to claim 2, wherein
    the predetermined function is defined including a parameter based on an occurrence frequency distribution of a degree of similarity of pattern data or a parameter based on a statistical value of the values of the degree of similarity for each pattern data with other pattern data.

4. A data classifier according to claim 2, wherein
    the predetermined function is a function wherein the value relatively rapidly and asymptotically approaches a minimum value with a decrease in the degree of similarity.

5. A data classifier for classifying a plurality of input pattern data into one or more clusters, wherein
    (a) for each pattern data, a cluster to which the pattern data belongs is provisionally determined;
    (b) each pattern data is sequentially selected as observational pattern data which is to become a target to be classified into a cluster;
    (c) for each cluster, a predetermined correlation value is calculated between one or more pattern data belonging to the cluster and the observational pattern data which is a target to be classified into a cluster;
    (d) a cluster to which the observational pattern data should belong is determined based on the correlation value for each cluster; and
    the processes of (b), (c), and (d) are repeated until there is no change in the cluster to which each pattern data should belong, and each pattern data is classified into a cluster.

6. A data classification method for classifying a plurality of input pattern data into one or more clusters, comprising the steps of:
    provisionally determining, for each pattern data, a cluster to which the pattern data belongs;
    calculating, for each cluster, a predetermined correlation value between one or more pattern data belonging to the cluster and observational pattern data which is a target to be classified; and
    determining a cluster to which the observational pattern data belongs based on the correlation value for each cluster.

7. A data classification method for classifying a plurality of input pattern data into one or more clusters, comprising the steps of:
    provisionally determining, for each pattern data, a cluster to which the pattern data belongs;
    for each cluster, determining, using a predetermined function, a degree of similarity between each pattern data belonging to the cluster and observational pattern data which is a target to be classified into a cluster and calculating a correlation value by summing the values of the degree of similarity; and
    determining a cluster to which the observational pattern data belongs based on the correlation value for each cluster.

8. A data classification method according to claim 7, wherein
the predetermined function is defined including a parameter based on an occurrence frequency distribution of a degree of similarity of pattern data or a parameter based on a statistical value of the values of the degree of similarity for each pattern data with other pattern data.

9. A data classification method according to claim 7, wherein
the predetermined function is a function wherein the value relatively rapidly and asymptotically approaches a minimum value with a decrease in the degree of similarity.

10. A data classification program embodied on a computer-readable medium which, when executed, causes a computer to classify a plurality of input pattern data into one or more clusters by executing the steps of:
provisionally determining, for each pattern data, a cluster to which the pattern data belongs;
calculating, for each cluster, a predetermined correlation value between one or more pattern data belonging to the cluster and observational pattern data which is a target to be classified into a cluster; and
determining a cluster to which the observational pattern data belongs based on the correlation value for each cluster.

11. A data classification program embodied on a computer-readable medium which, when executed, causes a computer to classify a plurality of input pattern data into one or more clusters by executing the steps of:
provisionally determining, for each pattern data, a cluster to which the pattern data belongs;
for each cluster, determining, using a predetermined function, a degree of similarity between each pattern data belonging to the cluster and observational pattern data which is a target to be classified into a cluster and calculating a correlation value by summing the values of the degree of similarity; and
determining a cluster to which the observational pattern data belongs based on the correlation value of each cluster.

12. A data classification program embodied on a computer-readable medium according to claim 11, wherein
the predetermined function is defined including a parameter based on an occurrence frequency distribution of a degree of similarity of pattern data or a parameter based on a statistical value of the values of the degree of similarity for each pattern data with other pattern data.

13. A data classification program embodied on a computer-readable medium according to claim 11, wherein
the predetermined function is a function wherein the value relatively rapidly and asymptotically approaches a minimum value with a decrease in the degree of similarity.

* * * * *